Patented Jan. 28, 1947

2,414,980

UNITED STATES PATENT OFFICE 2,414,980

PROCESS OF WORKING UP REFRACTORY MAGNESIA-CONTAINING ROCK

Robert A. Schoenlaub, Tiffin, Ohio, assignor to Basic Refractories, Inc., Cleveland, Ohio, a corporation of Ohio No Drawing. Application February 19, 1943, Serial No. 476,496

5 Claims. (Cl. 23—67)

This invention relates to the working up of refractory magnesia-providing material, and the attaining of products having refractory utility, or products of higher grade, as desired. As native sources of high grade magnesia are deficient, importation has in general been relied upon but it is subject to very serious interruptions. Various efforts have been made accordingly from time to time to utilize native low grade resources, and magnesia has heretofore been extracted from carbonate rocks by several methods. In one method, burned dolomite has been reacted with magnesium chloride brines to precipitate magnesium hydroxide and form calcium chloride. In another method, burned dolomite has been hydrated and treated with carbon dioxide to form soluble magnesium bicarbonate which is removed in solution from the insoluble calcium carbonate. In still another method, burned dolomite has been leached with water or sugar solution to remove the more soluble calcium hydroxide and leave behind the more insoluble magnesium hydroxide contaminated with some calcium hydroxide. Of these methods, the reaction of magnesium chloride brines with dolomite has had some success, probably because magnesia is obtained from both brine and dolomite, and because in some cases by-products such as salt or bromine may also be obtained. Also, the bicarbonate method has had some success in the production of magnesia for insulation and chemical products where cost is not an important factor. For the most part however, magnesia derived by such methods is too expensive to compete with natural magnesites or brucites, as a source of magnesia for instance for refractories. Intrinsic difficulties in the pumping, settling and filtration of large quantities of dilute suspensions and solutions seem to preclude extensive use of conventional chemical ways for the extraction of magnesia from dolomite at a low cost.

The present invention is on lines primarily different from the older art. In the older art, a soluble salt is formed and removed in solution; whereas, in the practice of this invention, insoluble products are formed of such a nature that they may easily be mechanically separated. Also, thick suspensions are used in contrast to the dilute suspensions and solutions of the older art. Products and by-products are obtained which can readily be thickened and filtered, and considerable savings in the cost of operation are so effected. No accessory material in addition to the carbonate rock itself is required and no valueless bitterns or other waste products must be eliminated. By appropriate operational control, magnesian products ranging from chemical to refractory grades in quality and from light to heavy in form, and as either the carbonate or hydrous carbonate or oxide may be produced at the will of the operator. Other objects and advantages will appear from the following description.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

As indicated, the raw material may be a dolomite or other magnesia-providing carbonate or oxide or hydroxide rock, and in general relatively pure dolomite, impure dolomites, predazzite, pencatite, magnesite, etc., can be applied and for conciseness all such are hereinafter referred to as "dolomite."

The raw material should be preliminarily of such size as can conveniently be calcined. Calcination may be effected at any temperature which is above the dissociation temperature of magnesium carbonate, and as high as desired, the actual calcination temperature employed being usually a matter of economics. The dolomite may be for instance calcined to $CaCO_3$ and $CaO$ and $MgO$. This differential calcination is cheaper than complete calcination. Where calcining at high temperatures, the cost is correspondingly greater and more processing is required. Dolomite burned to an ignition loss of up to 10–15 per cent for example is satisfactory.

Some variation in the size of grain of the calcined dolomite forming the slurry is permissible. In some cases, a properly calcined dolomite will disintegrate to a desirable size when slaked in water. In other cases, some pulverization is necessary. Large particles may retain more magnesia and are somewhat more difficult to keep in suspension than fine particles. Small particles are apt to be mechanically entrained during separation or be occluded in the magnesium carbonate. The grain size best suited to any specific conditions is a matter of economics and operational convenience and can best be established by empirical means. For instance in practice, we have found a dolomite calcined to about 2400° F. and ground to —200 mesh prior to slaking to give good results.

The calcined dolomite, in a desirable size, is mixed with water to form a slurry. Desirable proportions are about one part of calcined dolomite to ten parts of water, although a few parts of water more or less may be employed, the practical criterion being that the slurry must not be too thick to be pumped or otherwise handled or too dilute for economic operation. Regardless of the thickness of the suspension, so long as it can be handled, the hydrated magnesium carbonate which forms on carbonation is comparatively free from calcium carbonate.

The slurry is agitated in a tank to keep the suspension uniform and is treated by bubbling a gas containing carbon dioxide gas through the suspension. Carbon dioxide may be in any concentration desired. It may be obtained from flue gas. Usually concentrations of about 30 per cent are satisfactory. Flue gas from the burning of oil or gas is desirable, as avoiding contamination of the products with ash. The gas desirably should be substantially free from sulphur. Carbon dioxide generated in the calcining step may be applied, and more may be obtained from conversion of magnesium carbonate to the oxide in a subsequent step of the process, or such supplemental carbon dioxide as necessary may be provided from any suitable source.

The efficacy of separation depends largely upon the carbonation. The technique of carbonation may be varied somewhat. Usually it is desirable to carbonate fairly rapidly until the hydrogen ion concentration drops from a pH of about 12.3 to 11.5; then to seed the suspension with magnesium carbonate in a suitable form and amount and stop carbonation for a short time, as for instance two hours. Then the carbonation may slowly proceed until the pH drops to about 7.2. At this point, the carbonating step is complete. The reaction may be carried out at room temperature, or about 70° F.

At the end of the carbonation as afore-described, the slurry contains fine aggregates of calcium carbonate and prismatic crystals of nesquehonite, $MgCO_3.3H_2O$. With proper carbonation, these two phases are discrete and separable. With improper carbonation, the nesquehonite may contain occluded calcium carbonate and the calcium carbonate may contain nesquehonite. Also, the nesquehonite crystals may be too fine or too variable in size for proper separation. The best separation may be obtained when the nesquehonite forms fairly large and uniform prisms.

The size and form of the nesquehonite crystals are largely determined by the number of crystal nuclei which are formed and the speed at which carbonation progresses. Too rapid a carbonation through the critical period in which nesquehonite starts forming, that is, when the pH drops from 12 to about 11.5, will form so many nesquehonite nuclei that in subsequent carbonation no large, easily separable crystals will be formed. The speed and technique of carbonation may be adjusted to give a desirable number of crystals. Best results seem to be obtained by seeding with large nesquehonite crystals in the critical period and thereafter carbonating slowly enough that the crystals grow without forming small new crystals.

I have found that calcium hydroxide will react with nesquehonite to form calcium carbonate and magnesium hydroxide. This reaction may be used, if desired, to eliminate an excess of small nesquehonite crystals. I normally carbonate so rapidly that calcium hydroxide within the grains is not completely reacted when nesquehonite begins forming in the solution. If the suspension is seeded at this critical point and the carbonation stopped for a short time, the small crystals of nesquehonite undesirably formed will be eliminated, leaving the seed crystals to fulfill their desired function. Alternatively, burned dolomite or lime may be used to eliminate undesirable nesquehonite nuclei crystals.

While complete carbonation may be accomplished in a very few hours or less, it is usually desirable to employ a period of 12 hours to several days, the exact time being a matter of compromise between purity of product and economics.

While I find that nesquehonite is suitably susceptible to separation, I do not wish to limit myself to this substance only. Nesquehonite forms from suspensions at temperatures of about 62° F. to 113° F. Thereabove, a finely crystallized phase forms which is difficult to separate. Below about 62° F. lansfordite, $MgCO_3.5H_2O$, forms in tabular crystals. Therefore, I intend the method to include any hydrated magnesium carbonate which may be synthetically formed in the presence of calcium carbonate and is mechanically separable, and all such are included in the term "magnesium carbonate" in the claims hereinafter.

In treating the slurry to separate magnesium and calcium carbonate, the magnesium carbonate, as indicated, is desirably separated as nesquehonite. The separation may be effected in different ways. If there is a marked difference in settling rates between the calcium carbonate and the nesquehonite, some separation can be made by hydraulic classification. Flotation for instance may desirably be employed.

Certain conditions favor flotation. Hydraulic classification may be used prior to flotation to remove slime, constituting particles smaller than about 10 microns. These slimes are rather pure calcium carbonate and may be worth recovery as a by-product. If left in the slurry, the fine calcium carbonate is susceptible to entrainment during flotation, thereby adversely affecting the magnesia product. The success of flotation is somewhat dependent upon the size of the nesquehonite crystals. If the breadth of such crystals is too small, flotation is uncertain and difficult. The form of the calcium carbonate is also a factor. For good results, this should be distinctly crystalline and not amorphous when examined microscopically. To obtain the desired degree of crystallinity, carbonation should be carried on in the absence of any foreign elements which might be derived from solution of metal containers. Also, a gentle rather than a violent agitation should be used in the carbonating vessels. The presence of small amounts of calcium chloride in the solution seems favorably to affect the form of the calcium carbonate.

Flotation may be accomplished by using suitable collectors. I have found sodium oleate, naphthenic acid and sodium palmate to be suitable, although others may be used. I have found a pH between 8 and 10 desirable. Above 9 to about 10, selectivity decreases to some extent, but such pH values would not normally be encountered. The pulp density does not seem to be important, and between 5 and 15 per cent solids has been generally satisfactory. The slurry is conditioned with about 0.5 pounds of collector per ton of solids and flotation carried out according to usual flotation practice. The nesquehonite is collected in the froth and the calcium carbonate in the tailings. Usually the collector itself will supply an adequate froth, although special conditions may require a frothing agent or some other modifying agent.

The nesquehonite froth coming from the flotation is then de-watered. If hydrous magnesium carbonate is desired, it is merely dried at a temperature lower than 150° F. If anhydrous magnesium carbonate is desired, the nesquehonite is heated to about 250° F. If a product is desired in the form of magnesium oxide, the nesquehonite may be heated to 1200–1600° F. in a suitable furnace, and the carbon dioxide may be recovered for use in the process. By suitable control of furnace temperature, either light or heavy oxide may be produced. Such oxides may in turn be hydrated to magnesium hydroxide, if the product be desired in such form.

The quality of magnesia recoverable is dependent upon the carbonation control and also upon the refinement in the flotation circuit. With normal carbonation along lines aforedescribed, about 86 per cent of the magnesia may be recovered by a single flotation step without de-sliming, and a product is obtained having the following composition, expressed on a calcined basis: $SiO_2$ 0.2 per cent, $R_2O_3$ 0.2 per cent, CaO 14.8 per cent, and MgO 84.0 per cent. This, with suitable purification can be changed to a product of the following composition, also on a calcined basis: $SiO_2$ 0.00 per cent, $R_2O_3$ 0.20 per cent, CaO 4.34 per cent, and MgO 95.37 per cent. The silica and other impurities of the original rock are concentrated in the residual carbonate sludge. Where desired, the small amount of calcium oxide present in this refined product may be removed by further treatment to obtain a product of chemical quality. The calcium carbonate residue may be used in the manufacture of Portland cement, agricultural dust, filler, etc.

As an example of my process: I calcined a dolomite from the Niagara formation, Northern Ohio, having the following composition: Ignition loss 47.3 per cent, $SiO_2$ 0.23 per cent, $Fe_2O_3$ 0.057 per cent, $Al_2O_3$ 0.065 per cent, CaO 30.3 per cent, MgO 21.2 per cent, at a temperature of about 2400° F. in a rotary kiln. The calcined product was then ground to 90 per cent minus 200 mesh, and hydrated in a suspension of 1 part of calcined dolomite to 10 parts of water. In glass-lined equipment this suspension was agitated and a gas containing about 30 per cent $CO_2$ bubbled through the suspension until the hydrogen ion concentration changed from a pH of about 12.3 to about 11.5, and the suspension was then seeded with a slurry containing nesquehonite crystals. The seed was grown by carbonating a small amount of magnesium hydroxide in a water suspension. I then stopped carbonation for a period of about 2 hours and allowed any excess nesquehonite nuclei to be absorbed by the action of residual calcium hydroxide. I then carbonated at a rate which was so adjusted that the seed grew to a large size without forming new and small crystals. The process was complete when the pH dropped below 8. The temperature was about 75° F. during this process and the nesquehonite in the final slurry was in large uniform crystals, with an average breadth of about 12 microns. I then thinned the suspension, in this case without de-sliming, to about 5 per cent of solids, and conditioned it with about one-half pound of naphthenic acid per ton of solids. This was then separated into two fractions by froth flotation. The products so formed were characterized by crystalline hydrous magnesium carbonate of uniform size and aggregates of smaller crystals of calcium carbonate, and in the concentrate product the magnesium carbonate very greatly predominated and provided the particular utilities for the product, while the tailings had a predominance of calcium carbonate determining its utilities. The distribution and products of the calcined dolomite was as follows:

Analysis of dried products:

|  | Tailings | Concentrates |
|---|---|---|
|  | Per cent | Per cent |
| Ignition loss | 45.72 | 62.15 |
| $SiO_2$ | 0.86 | 0.01 |
| $R_2O_3$ | 0.34 | 0.09 |
| CaO | 46.70 | 5.85 |
| MgO | 6.31 | 30.90 |

Analysis expressed on a calcined basis:

|  | Per cent | Per cent |
|---|---|---|
| $SiO_2$ | 1.6 | 0.2 |
| $R_2O_3$ | 0.6 | 0.2 |
| CaO | 85.9 | 14.8 |
| MgO | 11.6 | 84.0 |
| Amount of calcined product obtained from 100 parts of calcined dolomite | 59 | 41 |

The concentrates, mixed with suitable burning or auxiliary agents or fluxes, such as iron ore or serpentine, and calcined at about 2800° F., form a product suitable for maintenance use in furnace hearths.

By thus operating with a slurry or rather thick suspension instead of with customary dilute solutions, and by adjusting the temperature and crystal-forming conditions to selectively favor the formation of nesquehonite or other mechanically separable form of magnesium carbonate, a quick and satisfactory separation from lime may be effected. In such manner excellent refractories may be made from relatively low grade dolomite. Also, by supplementary refining the product may be more highly purified for other uses.

Other modes of applying the principle of the invention may be employed, change being made as regards the details described, provided the features stated in any of the following claims, or the equivalent of such, be employed.

I therefore particularly point out and distinctly claim as my invention:

1. In a process of working up refractory magnesia-providing rock, calcining dolomite, making a slurry with about ten parts of water to one part of calcined material, adjusting the temperature to about 75° F., agitating and rapidly treating the slurry with gas containing carbon dioxide while the pH changes from about 12.3 to about 11.5, stopping the feed of carbon dioxide for about two hours, then supplying carbon dioxide at a slow rate to a change of pH to about 7.2, de-sliming the slurry, subsequently thinning the slurry to about 5 per cent solids, and separating magnesium carbonate without destruction of the crystal form.

2. In a process of working up refractory magnesia-providing rock, calcining dolomite, making a slurry with about ten parts of water to one part of calcined material, and at about room temperature agitating and rapidly treating the slurry with gas providing carbon dioxide while the pH changes from about 12.3 to about 11.5, stopping the feed of carbon dioxide gas for a time, then supplying carbon dioxide gas at a slow rate to a change of pH to about 7.2, and separating magnesium carbonate without destruction of the crystal form.

3. In a process of working up refractory magnesia-providing rock, calcining dolomite, making a slurry with water, adjusting the temperature to not exceed about 113° F., agitating and treating the slurry with gas providing carbon dioxide while the pH changes from around 12 to around 11.5, stopping the feed of carbon dioxide gas for a time, then supplying carbon dioxide gas at a slow rate to a change of pH to around 7, and separating magnesium carbonate without destruction of the crystal form.

4. In a process of working up refractory magnesia-providing rock, calcining dolomite, making a slurry with water, adjusting the temperature to not exceed about 113° F., agitating and treating the slurry with gas providing carbon dioxide while the pH changes from around 12 to around 11.5, stopping the feed of carbon dioxide gas for a time, then supplying carbon dioxide gas at a slow rate to a change of pH to around 7, separating magnesium carbonate without destruction of the crystal form, calcining the magnesium carbonate concentrate, and returning the carbon dioxide to the carbonating zone.

5. In a process of working up rock containing magnesium and calcium carbonates, reacting on water suspended calcined products of such rock with carbon dioxide to a pH of about 11.5, interrupting the flow of carbon dioxide for a substantial period of time, until equilibrium of a sufficient number of nuclei to form large mechanically separable crystals of nesquehonite has been reached, then further carbonating at a relatively slow rate to an alkaline pH not over 8, and separating magnesium carbonate without destruction of the crystal form.

ROBERT A. SCHOENLAUB.